J. E. MUHLFELD.
FEED WATER APPARATUS.
APPLICATION FILED OCT. 22, 1913. RENEWED DEC. 22, 1916.
1,301,156.
Patented Apr. 22, 1919.
4 SHEETS—SHEET 4.
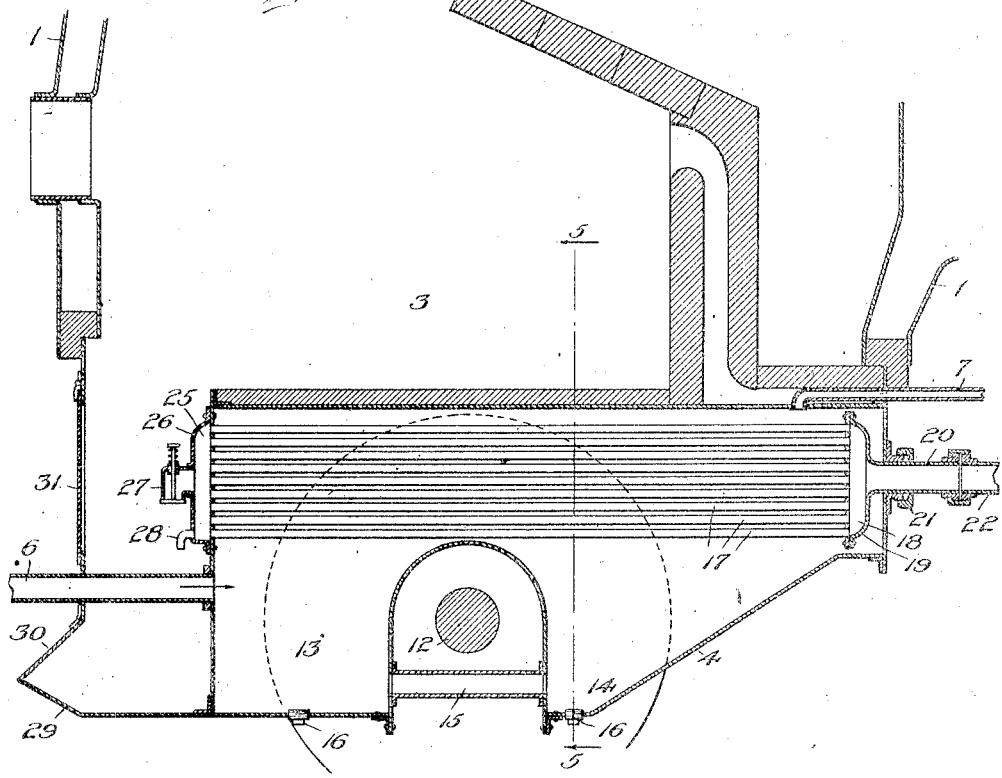
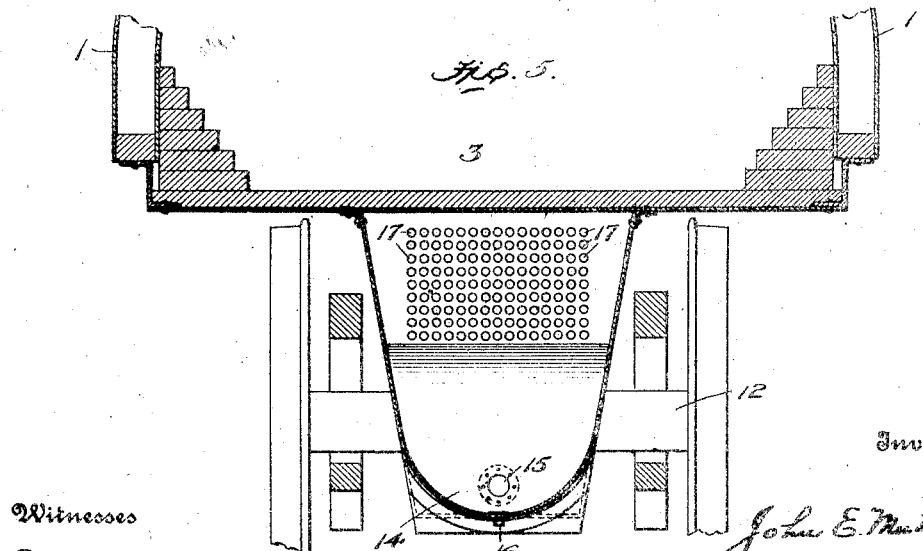

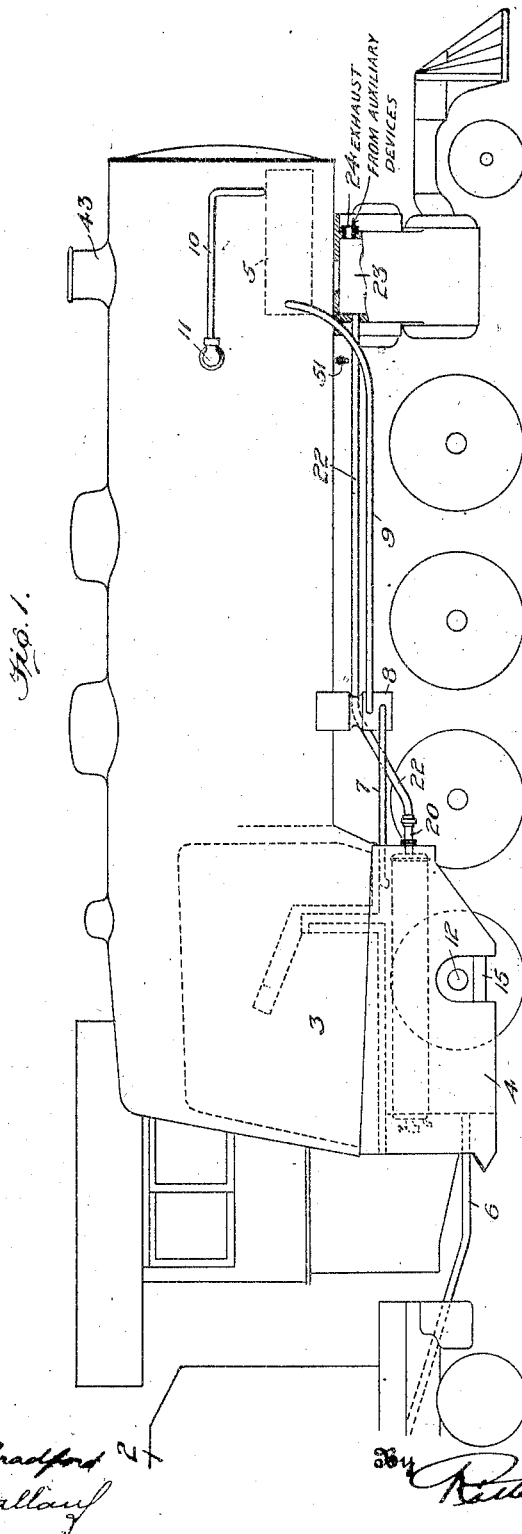

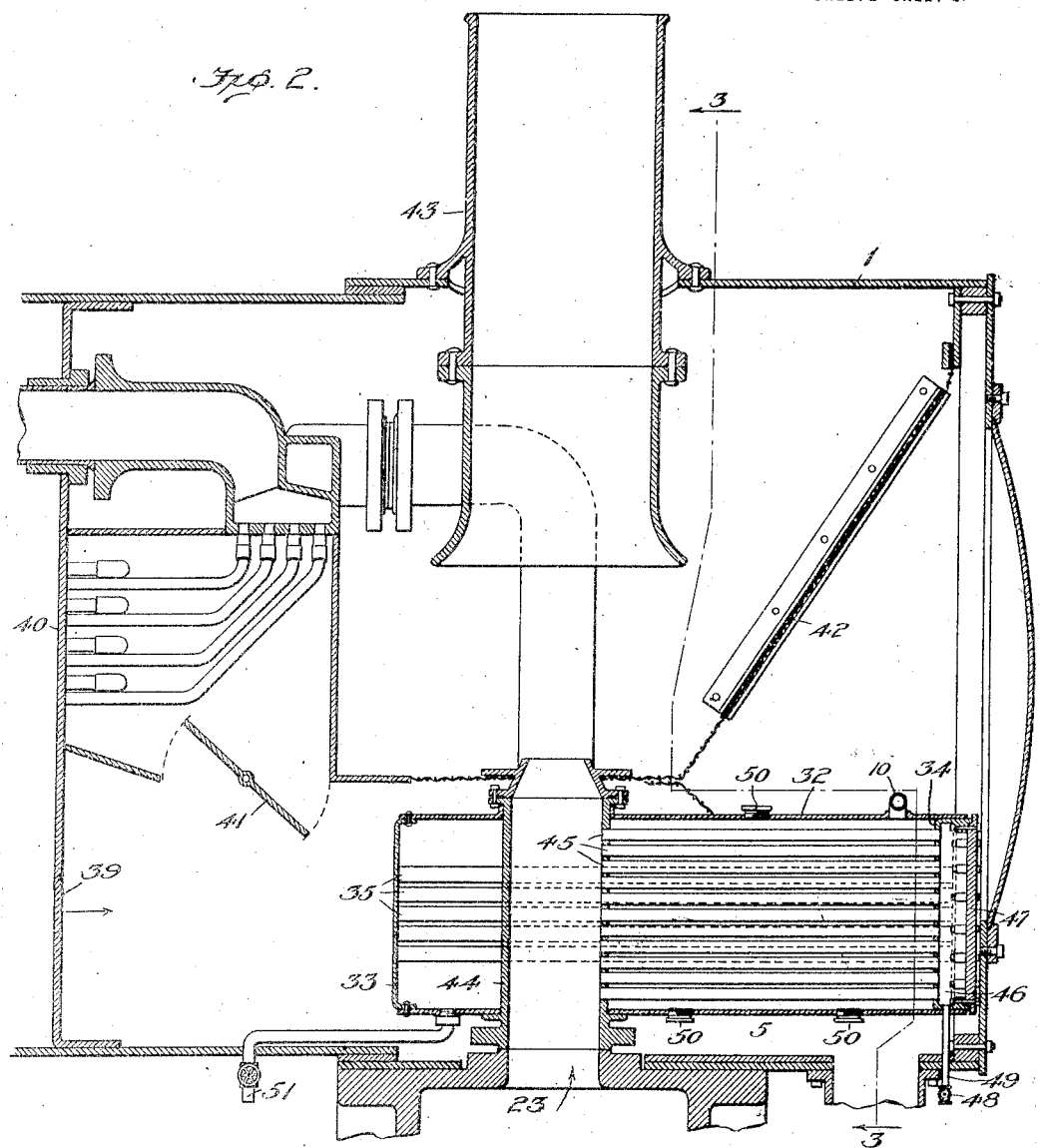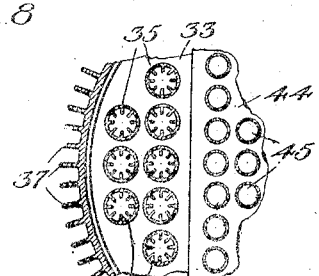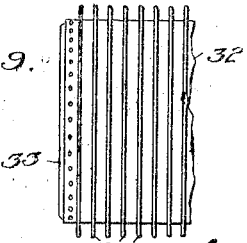

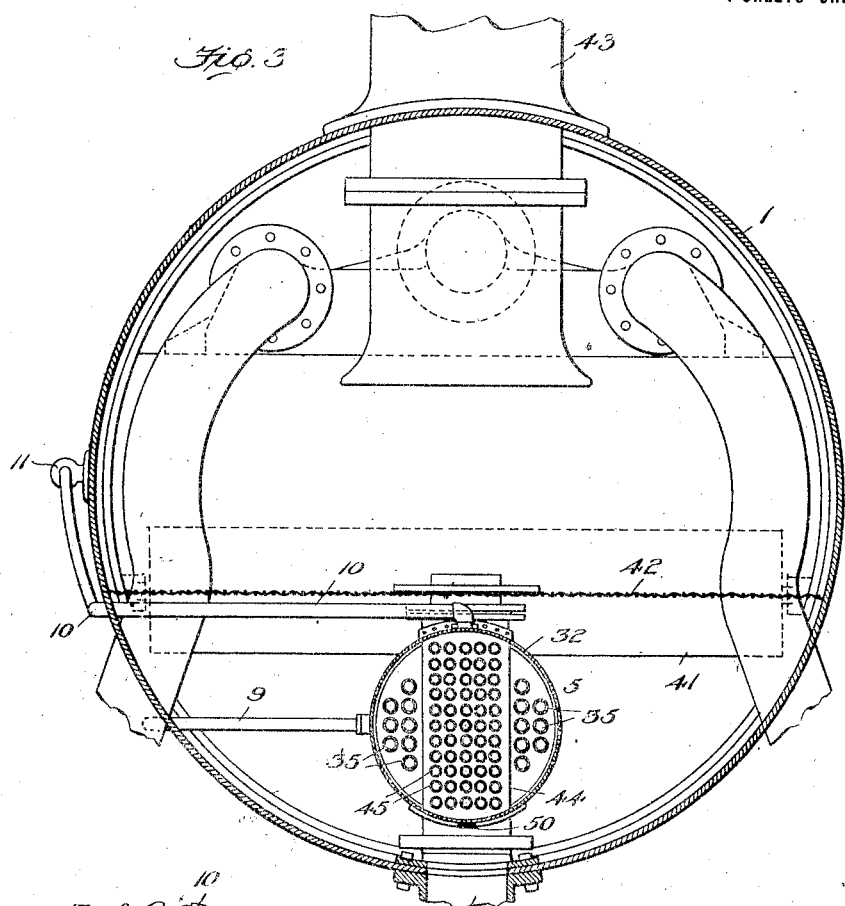
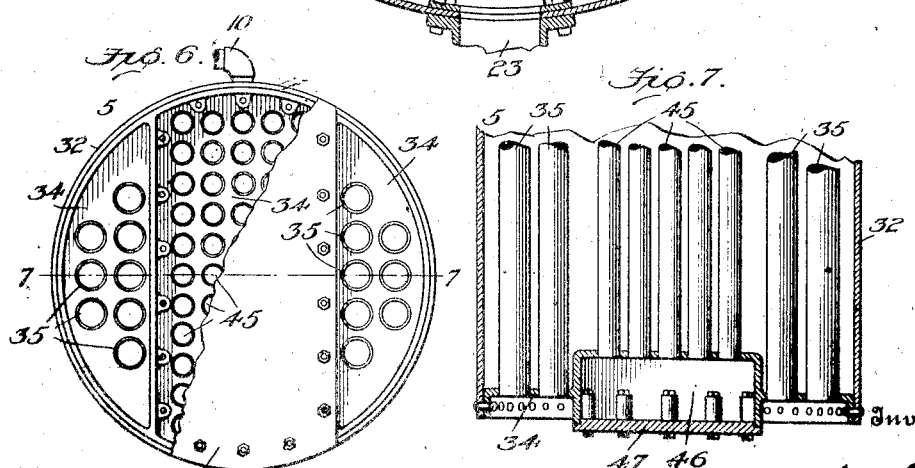

UNITED STATES PATENT OFFICE.

JOHN E. MUHLFELD, OF SCARSDALE, NEW YORK.

FEED-WATER APPARATUS.

1,301,156.　　　　Specification of Letters Patent.　　Patented Apr. 22, 1919.

Application filed October 22, 1913, Serial No. 796,602. Renewed December 22, 1916. Serial No. 138,493.

*To all whom it may concern:*

Be it known that I, JOHN E. MUHLFELD, a citizen of the United States, residing at Scarsdale, in the county of Westchester and State of New York, have invented certain new and useful Improvements in Feed-Water Apparatus; and I do hereby declare the following to be a full, clear, and exact description of the invention, such as will enable others skilled in the art to which it appertains to make and use the same.

My invention relates to devices for preheating and purifying boiler feed water in a manner resulting in the economizing of fuel; and, more especially my invention is particularly designed to be highly advantageous when applied to steam locomotives, enabling the attainment of increased efficiency and economy in boiler, locomotive and train operation and reducing the labor of the engine crew and the likelihood of road delays and failures such as result from locomotives not maintaining their rated tractive power capacity.

The object of my invention, generally stated, is to produce practical and efficient means and combinations and arrangements of devices, in steam or other locomotive or motive power dependent upon heat for the generation of power, for utilizing some of the waste heat from furnace combustion and from the power, heating and lighting equipment to preliminarily or initially heat and purify the boiler feed water; and to utilize some of the otherwise wasted heat from the power, heat and light generating equipment in conjunction with additional waste heat from the boiler, superheater and other flue hot gaseous products of combustion to further or finally heat and purify the boiler feed water prior to its entrance into the boiler for the generation of live steam.

To accomplish the before-noted objects I preferably employ primary or preliminary and secondary or final feed water heaters, the heaters being in communication through a boiler feed pump, thus relieving the water in the primary heater from boiler pressure during its heating therein and transmission therethrough and thereby reducing the effect of water hammer or ramming and decreasing the liability of failure of the heating apparatus. The primary or preliminary heater is preferably so arranged or located with respect to the furnace of the boiler that the furnace heat, which deflects downwardly and cannot be utilized for the generation of steam, impinges against or is communicated to the preliminary heater and thereby is availed of for heating the feed water in the preliminary heater, instead of being wholly wasted from the furnace by dissipation through the usual ash pan. Both the preliminary heater and the final heater are preferably heated by exhaust steam conducted through conduits communicating with the exhaust cavity of the cylinder saddle, while the final heater is preferably also subjected to the hot gaseous products of combustion issuing through the front flue sheet of the boiler. These, generally stated, are the principal features of my invention. The preferred structural form of the several devices employed in carrying out the invention will be presently described.

For the purpose of explanation I have illustrated my invention as applied to a single expansion cylinder type of steam locomotive in which the furnace is adapted for burning fuel oil, powdered coal or peat or similar fuel; but it will be understood that the invention is as applicable to any type of simple or compound cylinder locomotives of the articulated or non-articulated designs for passenger, freight, switch, or other services.

In the drawings illustrating my invention, the scope whereof is pointed out in the claims, Figure 1 is a diagrammatic view of a locomotive and its tender, showing the general arrangement of my invention as preferably applied thereto.

Fig. 2 is a longitudinal, vertical, detail section through the smoke-box of a locomotive having my invention embodied therein.

Fig. 3 is a sectional view taken on the line 3—3, Fig. 2.

Fig. 4 is a vertical, longitudinal, detail section through the furnace and preliminary feed-water heater.

Fig. 5 is a vertical, transverse section taken in the plane indicated by the line 5—5, Fig. 4.

Fig. 6 is a detail view in end elevation of the secondary or final feed-water heater, a portion of the cover for the steam chamber in the header of the heater being broken away.

Fig. 7 is a detail section of the secondary heater, taken in the plane of the line 7—7, Fig. 6.

Fig. 8 is a detail sectional view of a modified form of the secondary heater; and Fig. 9 is a detail view, in elevation, of a further modified form of the secondary heater.

In the preferred form of my invention which is illustrated in the drawings, 1 indicates a locomotive and 2 its tender. Closely adjacent to and beneath the floor of the fire-box or furnace 3 of the boiler is a primary feed-water heater 4, and within the smoke-box is a secondary heater 5 for the feed-water. The primary heater 4 is connected with the tender water tank storage space by a suitable flexible conduit 6 through which the water from the tender preferably gravitates into the lower part of the primary heater 4 near its rear end. Opening into the tank or shell of the primary heater, preferably through the upper portion thereof toward its forward end, is a conduit 7 which communicates with the water end of a steam or electric boiler-feed pump 8 and through which the feed water flows either by gravity or by the suction induced by the pump. From the water end of the pump 8 a pipe or conduit 9 leads to the secondary heater 5 and preferably from the upper, forward portion of the secondary heater a feed-water outlet pipe or conduit 10 leads to the water space of the boiler through a boiler check valve 11, which may be of any usual or desired construction. The feed-water is caused to flow from the pump 8 through the inlet pipe 9 to the secondary heater 5, through the latter and thence through the outlet pipe 10 to the boiler by pump or injector pressure in excess of boiler pressure.

The primary heater 4, which also serves as a storage tank for feed water, preferably straddles the rear driver wheel axle 12, as shown in Figs. 4 and 5, the storage capacity of the tank being thus made large and the settling and sediment chambers 13 and 14 of the tank or heater being thereby removed a comparatively great distance from the outlet conduit 7 leading to the boiler feed pump 8. The lower portions of the two downwardly extending legs or branches of the preliminary heater 4 preferably communicate directly with each other by means of a pipe 15 through which the feed water may pass to establish a circulation promoting rapid equalization of the temperature of the bodies of water in the lower legs of the heater. Blow-out plugs 16 in the bottom walls of the shell of the heater 4 permit the settling chambers 13 and 14 to be readily cleared of sediment.

In its upper part the primary heater 4 is preferably provided with a series of longitudinally extending tubes 17 through which passes the exhaust steam from the main engines, and, if desired, that from the air brake pump, boiler feed pump and other auxiliary devices, as well. To this end, the forward extremities of the tubes 17 communicate with a steam chamber 18 the head or cover 19 whereof is formed with a neck or nipple 20 which projects outwardly through the forward end wall of the shell or tank member of the heater 4, a suitable gland 21 being employed to prevent leakage of water from the tank at this point. The outer end of the neck 20 of the head of the tubular heater is coupled to a pipe or conduit 22 communicating with the cylinder saddle exhaust passage or cavity 23. The waste heat of the exhaust steam or hot gases from the boiler feed pump, air brake pump, pop valve and other auxiliary equipment which exhausts steam or otherwise wastes heat, may be led, if desired, into the conduit 22, preferably first passing into the exhaust cavity of the cylinder saddle through an auxiliary opening 24 which may be conveniently formed in the wall thereof for that purpose, so that these auxiliary exhausts, as well as the exhaust steam from the main engines, may find their way to the primary feed-water heater and, as will hereinafter appear, to the secondary heater 5 as well.

As shown more particularly in Fig. 4, the rear ends of the tubes 17 of the tubular heater preferably communicate with a chamber 25 which is formed by a cap or head 26 that is riveted or bolted to the rear wall of the shell or tank member of the primary heater 4 so as to include and house the open ends of all the tubes 17. The head 26 of the tubular heater may be conveniently provided with a suitable exhaust steam automatic outlet or safety valve, such as 27, and it also has a condensed exhaust steam drain 28 that communicates with the lower portion of the chamber 25. It will be noted that the tank or primary feed water heater 4 and the tubes 17 therein for the passage of the exhaust steam from the exhaust cavity of the cylinder saddle, in effect constitute a condenser with valved steam outlet 27 and drain outlet 28 for the discharge of the water of condensation, so that as the exhaust steam in condensing gives up its heat to the tank water the tendency to a vacuum in tubes 17 promotes the inflow of the exhaust steam from the cylinder saddle into which the main engines and commonly employed auxiliary equipment exhaust.

To the rear of primary heater 4 a draft pan 29 is preferably located. This draft pan, which opens into the fire-box or furnace 3, may be conveniently provided with a plurality of outwardly opening hinged doors or dampers 30 and 31, respectively, by which the draft to the fire-box may be regulated.

The secondary feed-water heater 5 preferably comprises a cylindrical shell 32 having a rear head 33 and a forward head 34.

Secured to and opening through these heads are longitudinally extending heat tubes or flues 35 which, if desired, may be interiorly ribbed or corrugated, as shown at 36, in Fig. 8, to increase their capacity for absorbing heat from the hot gases passing therethrough. For a similar purpose the exterior of the shell of the secondary heater may be ribbed or corrugated, either longitudinally as indicated at 37 in Fig. 8, or circumferentially as shown at 38 in Fig. 9.

The hot gaseous products of combustion issuing from the boiler tubes through the front flue sheet at 39, as well as those coming from the super-heater flues through the flue sheet at 40 and passing the damper 41, impinge upon and surround the exterior of the secondary heater 5 and pass in part through the heater tubes 35 and in part directly to the netting 42 and the stack 43, the feed-water within the heater shell 32 and surrounding the tubes 35 being thus heated.

In order that the exhaust steam may be also rendered available in a practical manner for heating the feed-water in the secondary heater 5, the exhaust nozzle stand 44 is preferably caused to pass through the shell 32 of the heater between the two laterally disposed clusters of longitudinally extending heater tubes 35 therein. Heat from the exhaust steam passing through the exhaust nozzle on its way from the exhaust cavity 23 of the cylinder saddle to the stack 43 is thus communicated to the feed-water within the heater 5. As a further means of communicating heat from the exhaust steam to the feed-water in the heater 5, it is preferred to provide the secondary heater with a plurality of steam tubes 45 which extend longitudinally from the front of the exhaust nozzle 44 to the forward head 34 of the heater, the tubes 45 being in communication with the interior of the exhaust nozzle at their rear ends and at their forward ends being in communication with a steam chamber 46 which may be conveniently formed by bolting a cover 47 to the head 34 so as to close a suitable centrally disposed recess or cavity in the latter. Condensation from exhaust steam may be eliminated from the steam chamber 46 through a drip valve 48 which communicates with the chamber through a pipe 49. By this arrangement of steam tubes 45 connected to the exhaust nozzle 44, exhaust steam from the main engines, as well as exhaust steam and waste heat from any auxiliary devices that may be vented through the exhaust nozzle, is permitted to pass into the steam tubes 45 and further heat the feed-water in the secondary heater 5 toward the outlet end thereof.

In order that the secondary heater may be readily cleaned it is preferred to provide its cylindrical shell 32 with wash-out plugs 50 and to provide a blow-off 51 of any usual or desired form communicating with the interior of the heater through the bottom of its shell 32.

I claim:

1. In apparatus of the character indicated, the combination of a boiler, a furnace, a feed water tank located below the furnace for containing boiler feed water prior to its entrance into the boiler, pressure-inducing means operatively interposed between said tank and boiler for causing the movement of the feed water from the feed water tank to the boiler, and means for admitting draft air to the furnace without passing between said feed water tank and furnace.

2. In apparatus of the character indicated, the combination of a boiler, a furnace, a feed water tank located beneath and in contact with the bottom of the combustion chamber of the furnace for containing boiler feed-water prior to its entrance into the boiler, and means for causing the circulation of the feed water from the feed water tank to the boiler.

3. In apparatus of the character indicated, the combination with a boiler and furnace, of a tank located beneath said furnace for containing boiler feed-water, a second tank also for containing boiler feed water, both of said tanks mounted on the locomotive, means for connecting said tanks so as to permit feed-water to pass between them, said means involving mechanism for causing the feed-water to flow from a point of lower pressure to a point of higher pressure, and means for permitting draft air to pass to the combustion chamber of the furnace without passing between said furnace and the said feed-water tank beneath it.

4. In apparatus of the character indicated, the combination with a boiler and furnace, of a plurality of connected feed-water heaters, one of said feed water heaters located in contact with the bottom of the combustion chamber of the furnace, and means for maintaining a difference in pressure between the two heaters and for causing the feed-water to pass to a higher level in the passing from the lower pressure heater to the higher pressure heater.

5. In a locomotive or like movable structure having a wheel support, the combination with a boiler, and boiler furnace, of a feed-water heater located beneath the furnace and between the wheels of the structure.

6. In a locomotive or like movable structure having a wheel support, the combination with a boiler and boiler furnace, of a feed water heater located beneath said furnace and having legs straddling the axle connection of the wheel support.

7. In apparatus of the character indicated, the combination with a boiler and main engines of a locomotive, of a primary feed-water heater, a secondary feed-water heater, both of said feed-water heaters mounted on the locomotive, means for permitting the feed-water to pass from the primary heater to the secondary heater, means for permitting the feed-water to pass from the secondary heater to the boiler, means for conveying to the primary heater steam exhausted from the main engines, and independent means for conveying to the secondary heater steam exhausted from the main engines.

8. In apparatus of the character indicated, the combination with the furnace boiler and main engines of a locomotive, of a primary feed-water heater provided with steam tubes, a secondary feed-water heater provided with steam tubes, both of said feed-water heaters mounted on the locomotive and one of them being beneath said furnace, means for permitting the feed-water to pass from the primary heater to the secondary heater, means for permitting the feed-water to pass from the secondary heater to the boiler, means for maintaining a less pressure in the primary heater than in the boiler, means for conveying to the tubes of the primary heater steam exhausted from the main engines, and independent means for conveying to the tubes of the secondary heater steam exhausted from the main engines.

9. In apparatus of the character indicated, the combination with a locomotive and locomotive tender, of a primary feed-water heater located beneath and in contact with the furnace of said locomotive, means for permitting feed-water to pass from the tender to said primary heater, a secondary feed-water heater upon said locomotive, and means for permitting feed-water to pass from said primary heater to said secondary heater.

10. In a locomotive or like movable structure having a wheel support, the combination with a boiler and boiler furnace, of a tank for containing boiler feed-water, said tank being located beneath said furnace between the wheel support of the structure and straddling the axle which connects the wheel support, and a conduit which extends beneath said axle and connects the lower portions of said tank.

11. In apparatus of the character indicated, the combination with the exhaust stand of an engine, of a feed-water heater having a shell encircling said exhaust stand and having tubes for the conveyance of steam which communicate with the exhaust stand, and which extend laterally from the steam passage thereof.

12. In apparatus of the character indicated, the combination with the boiler flues and exhaust stand of an engine, of a feed-water heater having a shell encircling said exhaust stand and having tubes which communicate with said exhaust stand and also having tubes permitting the passage of hot gaseous products of combustion issuing from the boiler flues.

13. In apparatus of the character indicated, the combination with the boiler, furnace, and main engines of a locomotive, the exhaust chamber of the main engines having an inlet for the exhaust from auxiliary steam operated devices, of a primary feed-water heater, a secondary feed-water heater, and means for conducting steam exhausted from said main engines to said heaters, and for conducting steam exhausted from said auxiliary devices to said heaters.

14. In apparatus of the character indicated, the combination with the boiler and furnace of a locomotive, of a feed-water heater located beneath and in contact with the bottom of the combustion chamber of said furnace whereby the feed water is heated by the downwardly deflected heat of the furnace, and means for causing the feed-water to pass from said feed-water heater to said boiler.

15. In apparatus of the character indicated, the combination of a boiler, a furnace, a feed-water heater in contact with the bottom of the combustion chamber of the furnace, and means for allowing draft air to enter said furnace without passing between said feed-water heater and furnace.

In testimony whereof I affix my signature, in the presence of two subscribing witnesses.

JOHN E. MUHLFELD.

Witnesses:
EMILY L. MYERS,
V. B. CARACRISTI.

Copies of this patent may be obtained for five cents each, by addressing the "Commissioner of Patents, Washington, D. C."